UNITED STATES PATENT OFFICE.

HENRY A. GARDNER, OF WASHINGTON, DISTRICT OF COLUMBIA.

PIGMENT AND METHOD OF PREPARING THE SAME.

1,216,981.  Specification of Letters Patent.  Patented Feb. 20, 1917.

No Drawing.  Application filed October 26, 1916.  Serial No. 127,923.

*To all whom it may concern:*

Be it known that I, HENRY A. GARDNER, a citizen of the United States, residing at Washington, in the District of Columbia, have invented certain new and useful Improvements in Pigments and Methods of Preparing the Same, of which the following is a specification.

This invention relates to a novel composition of matter comprising an organic vehicle such as linseed oil, oxidized oils, or other rubber-like compounds, in association with a pigment-material consisting of or containing substantial proportions of an insoluble compound of beryllium. The invention relates also to a paint pigment containing a compound of beryllium, and to methods whereby the said pigment may be prepared in a form possessing particular advantages for use in conjunction with organic vehicles of the type above mentioned.

I have found that paints possessing great hiding power may be produced by grinding in linseed oil or other suitable vehicle, pigments which contain a substantial proportion of a suitable beryllium compound, preferably beryllium oxid. Although I find that beryllium oxid alone constitutes an excellent pigment in conjunction with such vehicles, exposure tests have shown that excellent results are likewise obtained when other pigments, such as zinc oxid, white lead, silica, barium or calcium sulfate, etc., herein referred to as base pigments, are used in conjunction or admixture therewith. When a crystalline base pigment such as barium sulfate is used in conjunction with the beryllium pigment, the hiding power of the latter is extended through its strongly marked surface-coating action, whereby a satisfactory and relatively inexpensive product is obtained, in spite of the markedly inferior hiding power of the barium sulfate.

As a representative method by which such pigments may be produced, the following illustrative example is given:—

Beryllium-containing minerals, such as silicates and aluminates, are treated with acid sulfates or sulfuric acid; or they may be fused in the presence of various alkaline salts, such as the carbonates, and subsequently treated with acids. By these methods, it is possible to secure solutions of beryllium salts, to which may be added alkaline hydroxids. Beryllium hydroxid thus precipitated may be ignited to the oxid. Or if the carbonate of beryllium is desired, the proper proportion of alkaline carbonate may be added to the beryllium solution. In these methods of precipitation, I may have present various pigments such as barium sulfate, etc., upon which the beryllium pigment will be precipitated; or the barium sulfate may be formed by interaction between a soluble barium salt and the sulfuric acid radical of a beryllium sulfate solution. There are thus produced pigments such as barium sulfate, coated over with beryllium pigments precipitated at the same time and in the most intimate association or admixture therewith.

The precipitates formed by the above or equivalent methods may be washed, dried, calcined, and ground, if necessary, being thereby suitably prepared for the manufacture of paints, and may be mixed with zinc oxid, white lead or other pigments in any desired proportion. For instance, I have secured excellent results with a pigment containing 25 parts by weight of beryllium oxid, 50 parts by weight of barium sulfate, and 25 parts by weight of zinc oxid.

Pigments prepared as herein described, either consisting of or containing substantial proportions of beryllium oxid or other beryllium compounds, are well adapted for use in paints in conjunction with linseed oil and other usual paint vehicles, and also for compounding with rubber as colorants, and for the purpose of increasing its tensile strength. In this latter case, the rubber constitutes an organic vehicle in the sense in which the term is used herein. The new pigments are also well adapted for use in admixture with oxidized oils or other organic vehicles in linoleum or other like compositions.

I claim:—

1. A new composition of matter, comprising an organic vehicle and a pigment, said pigment containing a substantial proportion of an insoluble compound of beryllium.

2. As a new composition of matter, a paint-pigment comprising beryllium oxid and a base pigment.

3. As a new composition of matter, a paint-pigment containing a substantial proportion of an insoluble precipitated compound of beryllium.

4. The method of preparing a pigment containing beryllium, which consists in precipitating an insoluble compound of beryllium in presence of a base pigment.

In testimony whereof I affix my signature.

HENRY A. GARDNER.